United States Patent
Elsaid Ibrahim et al.

(10) Patent No.: US 10,474,944 B2
(45) Date of Patent: Nov. 12, 2019

(54) RFID TAG AND RFID READER

(71) Applicants: Fraunhofer-Gesellschaft zur Foerderung der angewandten Forschung e.V., Munich (DE); Friedrich-Alexander-Universitaet Erlangen-Nuernberg, Erlangen (DK)

(72) Inventors: Hazem Elsaid Ibrahim, Erlangen (DE); Hamed Kenawy, Eindhoven (NL); Joerg Robert, Uttenreuth (DE); Albert Heuberger, Erlangen (DE); Wolfram Strauss, Nuremberg (DE)

(73) Assignees: Fraunhofer-Gesellschaft zur Foerderung der angewandten Forschung e.V., Munich (DE); Friedrich-Alexander-Universitaet Erlangen-Nuernberg, Erlangen (DE)

( * ) Notice: Subject to any disclaimer, the term of this patent is extended or adjusted under 35 U.S.C. 154(b) by 0 days.

(21) Appl. No.: 16/059,741

(22) Filed: Aug. 9, 2018

(65) Prior Publication Data

US 2018/0349753 A1    Dec. 6, 2018

Related U.S. Application Data (63) Continuation of application No. PCT/EP2017/052697, filed on Feb. 8, 2017.

(30) Foreign Application Priority Data

Feb. 12, 2016    (EP) .................................... 16155475

(51) Int. Cl.
*G06K 19/077*    (2006.01)
*G06K 7/10*    (2006.01)

(52) U.S. Cl.
CPC ... *G06K 19/07796* (2013.01); *G06K 7/10019* (2013.01); *G06K 7/10039* (2013.01)

(58) Field of Classification Search
CPC ......... G06K 19/07796; G06K 7/10019; G06K 7/10039
See application file for complete search history.

(56) References Cited

U.S. PATENT DOCUMENTS

| | | |
|---|---|---|
| 7,246,751 B2 | 7/2007 | Diorio et al. |
| 8,193,912 B1 | 6/2012 | Gutnik et al. |
| 2011/0148599 A1 | 6/2011 | Park et al. |

OTHER PUBLICATIONS

Angerer, Christoph et al., "RFID Reader Receivers for Physical Layer Collision Recovery", IEEE Transactions on Communications, XP011340167, Dec. 2010, vol. 58, No. 12, pp. 3526-3537.

(Continued)

*Primary Examiner* — Thomas S McCormack
(74) *Attorney, Agent, or Firm* — Perkins Coie LLP; Michael A. Glenn (57) ABSTRACT

What is described is an Radio Frequency Identification (RFID) tag configured for communicating with an Radio Frequency Identification (RFID) reader, wherein the RFID tag is configured to receive a query command from the RFID reader, to measure a duration of a TRcal signal comprised by the query command, and to determine an individual Backscatter Link Frequency for communicating with the RFID reader based on the measured duration of the TRcal signal. The invention also refers to an RFID reader and to a corresponding method.

10 Claims, 11 Drawing Sheets

(56) References Cited

OTHER PUBLICATIONS

Bueno-Delgado, M.V. et al., "Analysis of DFSA Anti-collision Protocols in passive RFID environments", 35th Annual Conference of IEEE Industrial Electronics, XP032393080, 2009, pp. 2610-2617.
Global, E.P.C. Inc., "EPC™ Radio-Frequency Identity Protocols, Generation-2 UHF RFID, Specification for RFID Air Interface, Protocol for Communications at 860 MHz-960 MHz, Version 2.0.1 Ratified," from http://www.gs1.org/sites/default/files/docs/epc/Gen2_Protocol_Standard.pdf, (Jun. 15, 2016), XP055280790, Apr. 2015, pp. 26-43.
Global, E.P.C. Inc., "EPC™ Radio-Frequency Identity Protocols Class-1 Generation-2 UHF RFID Protocol for Communications at 860 MHz-960 MHz, Version 1.2.0, Specification for RFID Air Interface," Oct. 23, 2008, pp. 1-108.
Kaitovic, Jelena et al., "A smart collision recovery receiver for RFIDs", EURASIP Journal on Embedded Systems, vol. 7, 2013, pp. 1-19.
Kimionis, John et al., "Inventory Time Reduction in Gen2 with Single-Antenna Separation of FM0 RFID Signals", IEEE International Conference on RFID—Technologies and Applications, 2011, pp. 494-501.
Liu, Yuan et al., "Digital Correlation Demodulator Design for RFID Reader Receiver", IEEE Wireless Communications and Networking Conference WCNC 2007, pp. 1666-1670.
Salah, Named et al., "FFT Based Rate Estimation for UHF RFID Systems", 2015 European Conference on Smart Objects, Systems and Technologies, 2015, pp. 1-5.
Vannucci, Giovanni et al., "A Software-Defined Radio System for Backscatter Sensor Networks", IEEE Transactions on Wireless Communications, XP01121635, Jun. 2008, vol. 7, No. 6, pp. 2170-2179.

FM0 BASIS FUNKTION
Fig. 1a

FM0 GENERATOR STATE DIAGRAM
Fig. 1b

FM0 SEQUENCES
Fig. 1c

TRcal with rectangular shape
Fig. 4a

TRcal with slope 0.3 from the total length
Fig. 4b

TRcal with slope 0.9 from the total length
Fig. 4c

RFID TAG AND RFID READER

CROSS-REFERENCE TO RELATED APPLICATIONS

This application is a continuation of copending International Application No. PCT/EP2017/052697, filed Feb. 8, 2017, which is incorporated herein by reference in its entirety, and additionally claims priority from European Application No. 16155475.3, filed Feb. 12, 2016, which is also incorporated herein by reference in its entirety.

BACKGROUND OF THE INVENTION

The present invention relates to a Radio Frequency Identification tag, to a Radio Frequency Identification reader, and to a method for recognizing at least one Radio Frequency Identification tag.

Radio Frequency Identification (RFID) is an automatic identification system that uses wireless communications to identify objects. Nowadays, large amounts of RFID tags are used in supply chains for product identification or sensor networks (see e.g. G. Vannucci, A. Bletsas, and D. Leigh, A Software-Defined Radio System for Backscatter Sensor Networks, IEEE Transactions on Wireless Communications, vol. 7, pp. 2170-2179, 2008), especially, where the cost and energy are critical.

One of the biggest RFID challenges is the capability to resolve tag collisions.

All RFID tags within the reading area of a reader are scheduled using Frame Slotted Aloha (FSA). As a result, only a single tag response can be decoded successfully at a time.

The RFID tags select random slots. Nevertheless, when multiple tags reply simultaneously within the same slot, a collision occurs and the slot is discarded (see e.g. M. V. Bueno-Delgado, J. Vales-Alonso, and F. J. Gonzalez-Castaño, Analysis of DFSA Anti-collision Protocols in passive RFID environments, 35th Annual Conference of IEEE Industrial Electronics, pp. 2610-2617, 2009). Hence, either the recognition time increases or less RFID tags are recognized.

In UHF RFID systems, the rate of the tag replies variations are much more crucial than in other communication systems. In the EPCglobal Class-1 Gen-2 RFID protocol, this tag reply rate is called Backscatter Link Frequency (BLF, see EPC™ Radio-Frequency Identity Protocols Class-1 Generation-2 UHF RFID Protocol for Communications at 860 MHz-960 MHz, Version 1.2.0, EPCglobal Inc., 2007).

The US 2011/0148599 A1 suggests to allocate the RFID tags to different groups in order to reduce the chance of collisions. The RFID tags just reply to a query command after their group has received a so called wake-command.

Thus, an object of the invention is to improve the detection of RFID tags of a plurality of RFID tags in the vicinity of an RFID reader.

SUMMARY

An embodiment may have a radio Frequency Identification (RFID) tag configured for communicating with an Radio Frequency Identification (RFID) reader, wherein said RFID tag is configured to receive a query command from said RFID reader, wherein said RFID tag is configured to measure a duration of a TRcal signal comprised by said query command, and characterized in that said RFID tag is configured to determine an individual Backscatter Link Frequency (BLF) for communicating with said RFID reader based on said measured duration of said TRcal signal and on an individual number, wherein said RFID tag is configured to determine said individual number by generating a random number.

Another embodiment may have a Radio Frequency Identification (RFID) reader configured for communicating with an Radio Frequency Identification (RFID) tag, wherein said RFID reader is configured to send a query command to said RFID tag, and wherein said query command enables said RFID tag to determine a Backscatter Link Frequency (BLF) for communicating with said RFID reader, wherein said RFID reader is configured to send said query command having a TRcal signal with a given duration within said query command, wherein said TRcal signal ends with a pulse with a given pulse width, and characterized in that a part of said TRcal signal between a beginning of said TRcal signal and a beginning of said pulse differs from a signal having a constant value by having a slope with a given value ending at said beginning of said pulse, thereby rendering harder the determination of the BLF by the RFID tag.

According to still another embodiment, a method for recognizing at least one Radio Frequency Identification (RFID) tag by a Radio Frequency Identification (RFID) reader may have the steps of: sending a query signal to said RFID tag, determining by said RFID tag an Backscatter Link Frequency (BLF), and communicating by said RFID tag using said BLF, characterized in that said RFID tag determines as the BLF an individual Backscatter Link Frequency (BLF) for communicating with said RFID reader based on a measured duration of said TRcal signal and on an individual number, wherein said RFID tag determines said individual number by generating a random number, and/or said RFID reader sends said query command having a TRcal signal with a given duration within said query command, wherein said TRcal signal ends with a pulse with a given pulse width, and wherein a part of said TRcal signal between a beginning of said TRcal signal and a beginning of said pulse differs from a signal having a constant value by having a slope with a given value ending at said beginning of said pulse, thereby rendering harder the determination of the Backscatter Link Frequency (BLF) by the RFID tag.

The inventive Radio Frequency Identification (RFID) tag is configured for communicating with an Radio Frequency Identification (RFID) reader, wherein said RFID tag is configured to receive a query command from said RFID reader, wherein said RFID tag is configured to measure a duration of a TRcal signal comprised by said query command, and wherein said RFID tag is configured to determine an individual Backscatter Link Frequency (BLF) for communicating with said RFID reader based on said measured duration of said TRcal signal.

Contrary to the state of art, the invention proposes an individual Backscatter Link Frequency to be used by the RFID tags for responding to a query command of an RFID reader.

In one embodiment, the RFID tag is configured to determine said individual BLF based on said measured duration of said TRcal signal and on an individual number.

In an embodiment, the RFID tag is configured to determine either a common BLF or said individual BLF. Both Backscatter Link Frequencies (BLFs) are used for communicating with the RFID reader. The common BLF is determined based on the measured duration of the TRcal signal and the individual BLF is determined based on the measured duration of the TRcal signal and on the individual number of the RFID tag. With other words: The common BLF is determined solely based on values derived from the query signal. As this query signal can be received from all RFID tags within the vicinity of the RFID reader, all these RFID tags will determine the same (within the deviations discussed later on) BLF which is, thus, common to all RFID tags. The common BLF lies within a given tolerance band. The individual BLF is related to values obtained from the query command as well as to the individual number belonging to the individual RFID tag.

In the state of art, the aim is that all RFID tags use the same common BLF and the variation of the BLF values are merely tolerated. In the invention, these variations are enlarged in order to give every RFID tag its own individual BLF. Concerning the common BLF see, for example, the adjustment of the BLF provided by U.S. Pat. No. 8,193,912 B1.

In a further embodiment of the RFID tag, the RFID tag is configured to determine either said common Backscatter Link Frequency or said individual Backscatter Link Frequency depending on a switch signal. In this embodiment, the RFID reader acts on the RFID tag in order to switch between the two different frequencies using a specific command. The switch signal is in one embodiment comprised by the query command and is in a different embodiment a separate signal or command, advantageously, preceding the query command. Conventional RFID tags, i.e. RFID tags belonging to the state of art, are not able to understand the switch signal. However, when the switch signal is transmitted in a separate command the conventional RFID tags will ignore it and the modified RFID tags according to the invention will understand it. Including the switch signal into the query command may be done in a surrounding comprising only new RFID tags according to the invention.

In an embodiment of the RFID tag, the RFID tag is configured to determine said individual number by generating a random number. The random number in one embodiment is a 16-Bit random number (RN16). Such an RN16 is used usually for the reply of a RFID tag to an RFID reader allowing an acknowledgment procedure. The RFID tag in one embodiment calculates its individual number based on its RN16 envisaged by the standard.

The object is also achieved by a Radio Frequency Identification (RFID) reader configured for communicating with an Radio Frequency Identification (RFID) tag. The RFID reader is configured to send a query command to said RFID tag. The query command enables said RFID tag to determine an individual Backscatter Link Frequency (BLF) for communicating with said RFID reader.

The embodiments and details above with regard to the RFID tag are also applicable to the RFID reader and vice versa.

The enablement to obtain an individual BLF is done in one embodiment via a switch signal and is done in an alternative or additional embodiment via sending a specially shaped TRcal signal.

In an embodiment of the RFID reader, the RFID reader is configured to send a switch signal, and the switch signal determines whether the RFID tag determines either the individual BLF or a common BLF. In one embodiment, the query command is comprising the switch signal. In a different embodiment, the switch signal is a separate signal preceding the query command as such.

In an embodiment of the RFID reader, the RFID reader is configured to send the query command comprising a TRcal signal with a given duration within the query command. The TRcal signal ends with a pulse with a given pulse width. Further, a part of said TRcal signal between a beginning of said TRcal signal and a beginning of said pulse differs from a signal having a constant value. Usually, the TRcal signal is a rectangular signal ending with a negative pulse. In this embodiment, the part of the TRcal signal followed by the pulse is varied in order to make the measurement of the duration of the TRcal signal more difficult.

In one embodiment, the mentioned part of the TRcal signal comprises a slope with a given value ending at the beginning of said pulse. In this embodiment, the pulse at the end of the TRcal signal does not start with a step as in the state of art.

In an alternative or additional embodiment of the RFID reader, the RFID reader comprises a plurality of antennas.

According to one embodiment, the RFID reader is configured to send via the plurality of antennas query commands comprising differently shaped TRcal signals. In a further embodiment, the RFID reader sends from each antenna a query command with a differently shaped TRcal signal.

In an embodiment, the RFID reader is configured to switch between antennas of the plurality of antennas.

In an embodiment of the RFID reader, the RFID reader is configured to switch to an antenna of the plurality of antennas based on a Normalized Maximum Energy of signals received by the plurality of antennas. So, the RFID reader evaluates the received signals and derives for the antennas a normalized maximum energy, NME. After evaluating the maximum NME, the RFID reader switches to the antenna with the maximum NME.

In an embodiment of the RFID reader, the RFID reader is configured to receive signals and to identify within a received signal at least one RFID tag based on an energy of a reply of the RFID tag. In an embodiment, the identification is also done based on the Normalized Maximum Energy.

The object is also achieved by a Radio Frequency Identification (RFID) system comprising at least one Radio Frequency Identification (RFID) reader according to at least one of the above mentioned embodiments and also comprising at least one Radio Frequency Identification (RFID) tag according to at least one of the above mentioned embodiments.

The object is also achieved by a method for recognizing at least one Radio Frequency Identification (RFID) tag by a Radio Frequency Identification (RFID) reader. The method comprises at least the following steps:
  sending a query signal to the RFID tag,
  determining by the RFID tag an individual Backscatter Link Frequency (BLF), and
  communicating by the RFID tag using the individual BLF.

The individualization is either done by increasing the possibility of a measurement error (of the duration of the TRcal signal) via the shape of the TRcal signal or it is done by using an individual value for the calculation of the Backscatter Link Frequency. In one embodiment, both possibilities are used.

The above discussed embodiments and features of the RFID tags and RFID readers can also be realized via the method.

In one embodiment, the method allows to recognize at least one RFID tag from a plurality of RFID tags.

BRIEF DESCRIPTION OF THE DRAWINGS

Embodiments of the present invention will be explained in the following with regard to the accompanying drawings, in which.

DETAILED DESCRIPTION OF THE INVENTION

Figure 1A:
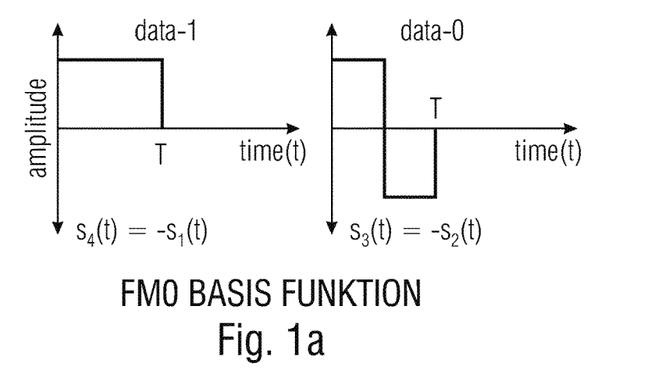
FIG. 1a-c shows: a) pulse shapes used in the FM0 encoding scheme,
  b) a diagram for the different possible combination within the FM0 encoding scheme, and
  c) resulting FM0 sequences.

According to EPCglobal standard, FM0 encoding scheme is the most popular encoding scheme used by UHF tags. The pulse shapes $s_n(t)$ for the symbols are selected among four possible pulse shapes as shown in FIG. 1a, where $s_2(t)$ and $s_3(t)$ represent data-0, and $s_1(t)$ and $s_4(t)$ represent data-1.

Figure 1B:
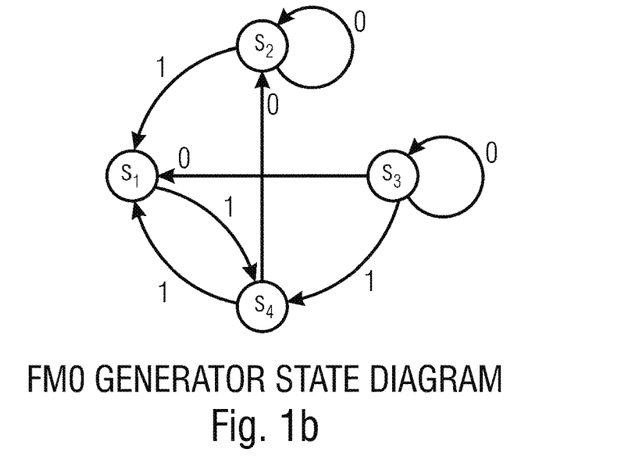
Figure 1C:
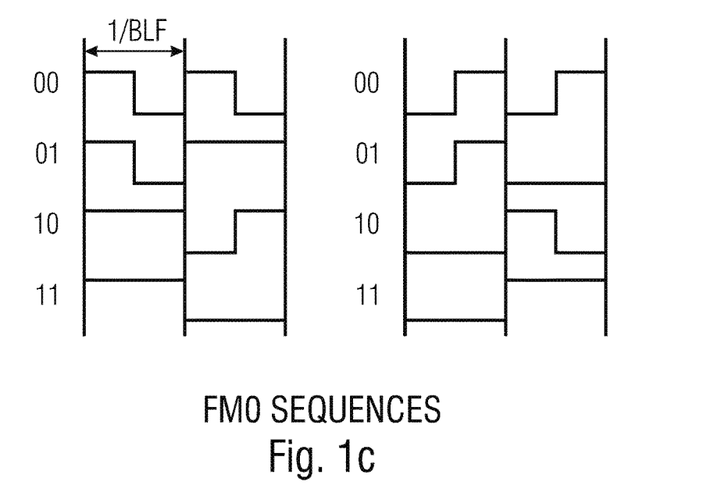

Based on the state diagram in FIG. 1b, the symbols are arranged to feature a level transition at each boundary. For example, the pulse $s_2(t)$ can only be followed by $s_2(t)$ or $s_1(t)$, but not by the symbols $s_3(t)$ or $s_4(t)$ to keep the feature of a level transition between symbols as shown in FIG. 1c. According to the standard, the nominal symbol duration value is the inverse of the Backscatter Link Frequency, BLF.

Thus, the symbol period is related to the BLF by: T=1/BLF as shown in FIG. 1c.

Figure 2:
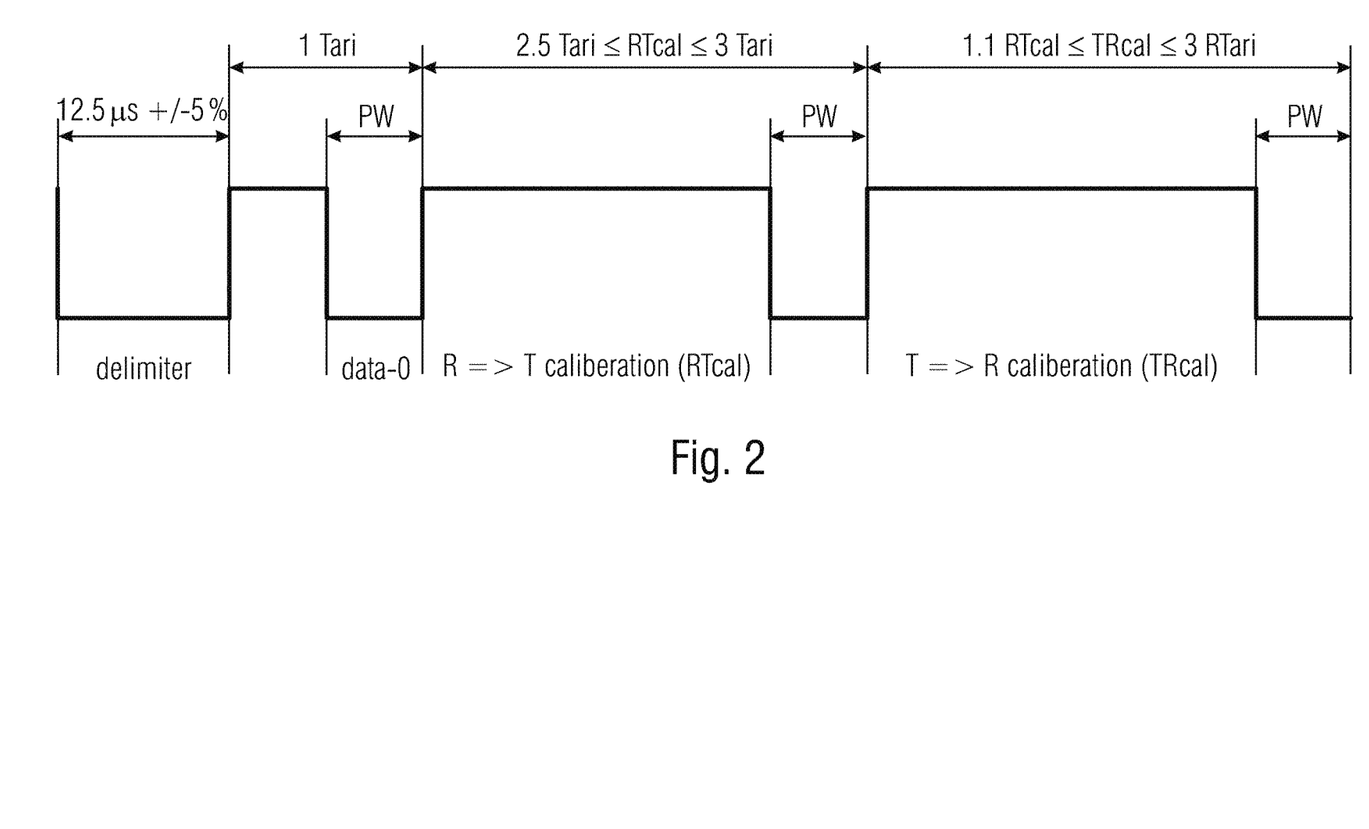
FIG. 2 shows a preamble of a query command.

The RFID tag calculates its BLF in the following way:

The reader sends a query command to the RFID tag to ask about its ID. This command contains a preamble of four fields as shown in FIG. 2.

First, the delimiter is used by the RFID tag to determine the start of the command. Second, the data-0-signal and the RTcal signal are used by the RFID tag to decode the reader commands. Finally, the fourth field consisting of a TRcal signal is measured by the RFID tag to calculated the BLF as:

$$BLF = DR/TRcal \qquad (1)$$

Where DR is a divide ratio field of length one bit in the query command. The DR has two possible values 8 or 64/3 based on the value of the field 0 or 1 respectively.

Three of the four fields or signals of the query commands end with a low pulse with a given width (PW, see also U.S. Pat. No. 7,246,751 B2).

Based on the standard, there is a tolerance between the BLF that is submitted from the reader via the values of TRcal and DR and the BLF that the RFID tag is actually using.

The tolerance is mainly the result of the measurement error in TRcal. The tolerance varies from +/−4% at 75 µs≤TRcal≤200 µs and DR=8 (40 kHz≤BLF≤107 kHz), and +/−22% at 33.3 µs≤TRcal≤66.6 µs and DR=64/3 (320 kHz≤BLF≤640 kHz).

Figure 3:
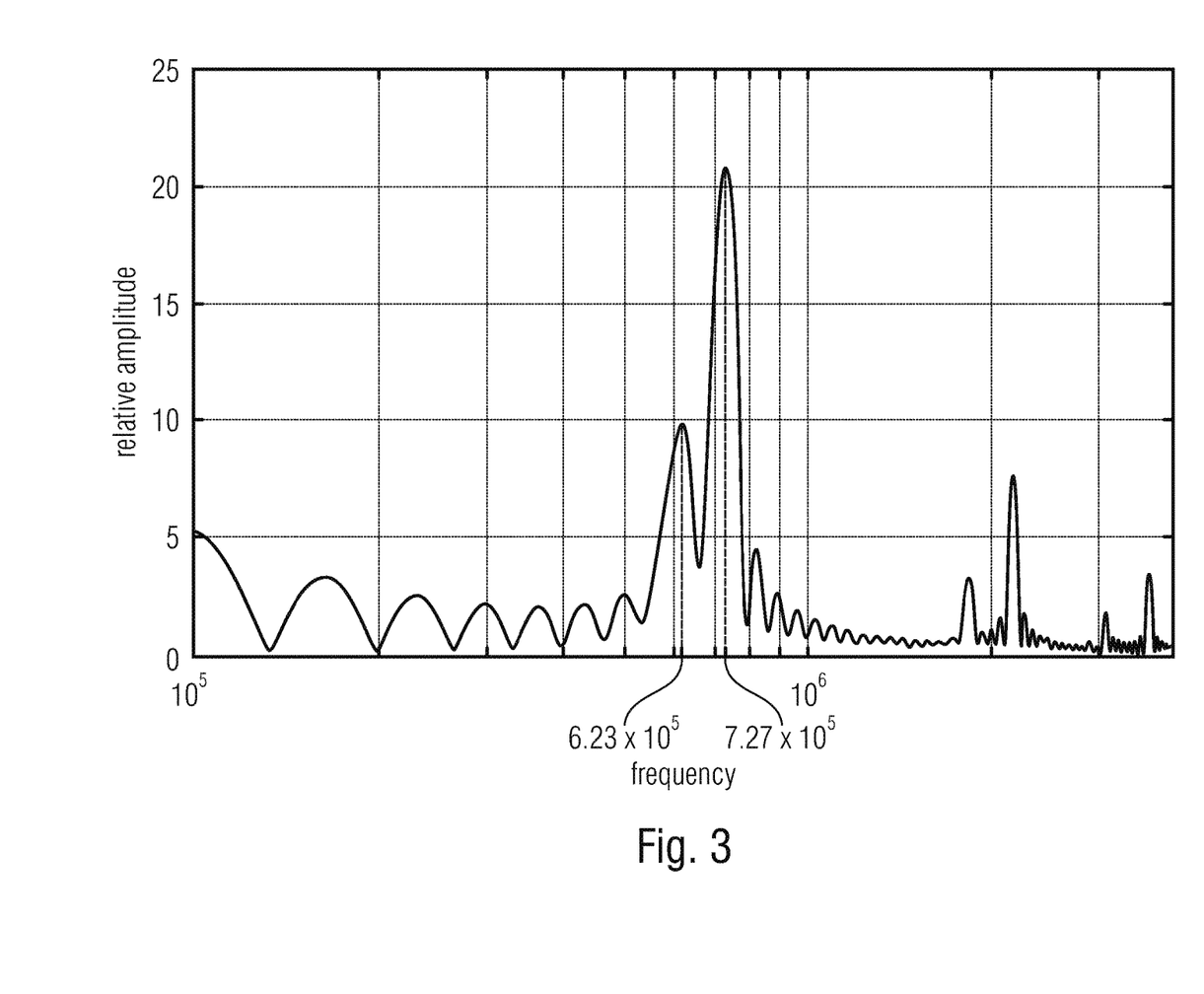
FIG. 3 shows a spectrum with the response of two RFID tags.

FIG. 3 shows the frequency response for 18 bits preamble of two collided RFID tags using FM0 as an encoding scheme at nominal BLF=640 kHz. Due to the error in measuring the duration of the TRcal signal, the first RFID tag replies with tolerance of −3.7% and the second one replies with tolerance of +11.6%.

The BLF variations arise from two reasons that cannot be avoided in practical systems. Firstly, low cost RFID tags use a slow system clock for the digital baseband operation, resulting in a measurement error for the parameters that are transmitted by the RFID reader to determine the RFID tag data rate. Secondly, the tag clock frequency is usually affected by manufacturing process variations, which also contribute to the BLF variations. Based on the standard, the BLF tolerance depends on tags data rate, where the range of data rate in EPCglobal Class-1 Gen-2 is from 40 kHz to 640 kHz.

Most of the previous research focusing on collision recovery for RFID system assumes that the collided RFID tags have the same BLF and are fully synchronized. It was found that this assumption is not valid.

Angerer et al. (C. Angerer, R. Langwieser, and M. Rupp, RFID Reader Receivers for Physical Layer Collision Recovery, IEEE Transactions on Communications, vol. 58, no. 12, pp. 3526-3537, 2010) propose an algorithm for channel estimation for two colliding RFID tags. The algorithm can be used with single and multiple antennas to separate the collided RFID tags. However, they did not take the BLF tolerance into account in their simulations.

Kimionis et al. (J. Kimionis, A. Bletsas, A. G. Dimitriou, and G. V. Karystinos, Inventory Time Reduction in Gen2 with Single-Antenna Separation of FM0 RFID signals, IEEE International Conference on RFID-Technologies and Applications, pp. 494-501, 2011) propose a collision recovery technique to separate two collided RFID tags only based on the RFID tag reply encoding scheme properties. However, the authors did not take into account the BLF tolerance.

Kaitovic et al. (J. Kaitovic, R. Langwieser, and M. Rupp, A smart collision recovery receiver for RFIDs, EURASIP Journal on Embedded Systems, 2013:7, 2013) propose a channel estimation technique that could be used to separate up to eight collided RFID tags per slot. However, this technique is not compatible with the EPCglobal Class-1 Gen-2 RFID protocol, and also the rate tolerance is not taken into account.

In the invention, the rate variations are utilized to decode the strongest RFID tag reply in a collided slot. In addition, the rate tolerance is stimulated by two different techniques which can be applied separately. In an embodiment, both techniques are used to increase their effect.

First, the rate tolerance can be stimulated by changing the shape of the Tag to Reader Calibration signal (TRcal), the signal that is transmitted from the RFID reader to be measured by the RFID tag to determine its BLF. Due to changing the shape of this signal, the measurement process in the RFID tag is harder, therefore, the tolerance is increased.

Second, in addition or as an alternative, each RFID tag generates a random number of 16 bits as a short ID after receiving the query command that is asking about RFID tags IDs. This number is called RN16 and it is uniformly distributed. After measuring the TRcal signal, the RFID tag will calculate its BLF as a function of the TRcal signal and its RN16 being its own individual number. This is one example for the individual number which is used by the RFID tags to calculate their individual Backscatter Link Frequencies.

In addition to the BLF tolerance stimulation, a new multiple antenna RFID reader is proposed to utilize the tolerance stimulation. The new reader will estimate the rate of the RFID tag that has strongest energy instead of strongest power (compare H. Saleh, H. A. Ahmed, J. Robert, and A. Heuberger, FFT Based Rate Estimation for UHF RFID Systems, 2015 European Conference on Smart Objects, Systems and Technologies, pp. 1-5, 2015) to benefit from the rate tolerance. When two RFID tags collide, the RFID tag that has a lower rate might have lower power but it has a higher energy. Also, in one embodiment, the receiver can select the antenna that has the best Signal to Interference Ratio (SIR).

In an additional embodiment, due to the difficulty of estimating the energy of the interferes, a new metric is defined which is called Normalized Maximum Energy, NME. Based on this metric the receiver can select the best antenna.

One reason for the different BLF values used by the RFID tags is the difficulty of measuring the duration of the TRcal signal.

Therefore, if the error of this measurement is increased, the distance in the frequency domain will be larger, hence, the collided slot can be recovered.

Because of that, changing the shape of the TRcal signal and making it a non-rectangular shape increases the tolerance as the measurement process of TRcal will be harder.

Figure 4A:
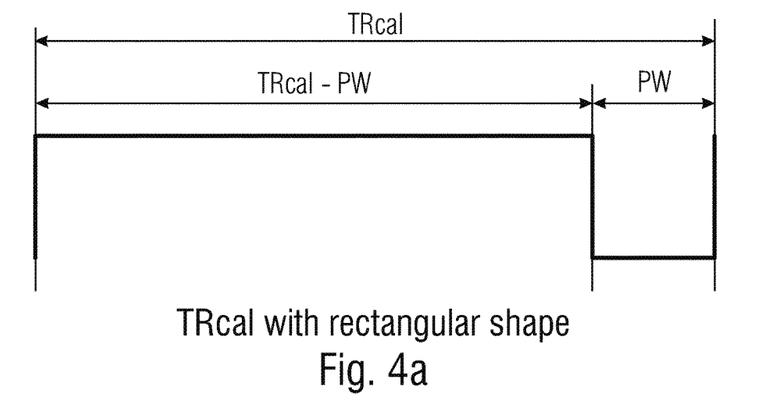
FIG. 4a-c shows three differently shaped TRcal signals.
Figure 4B:
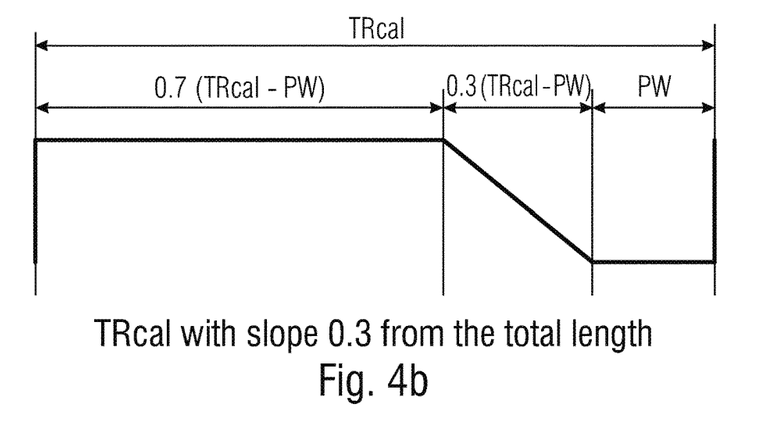
Figure 4C:
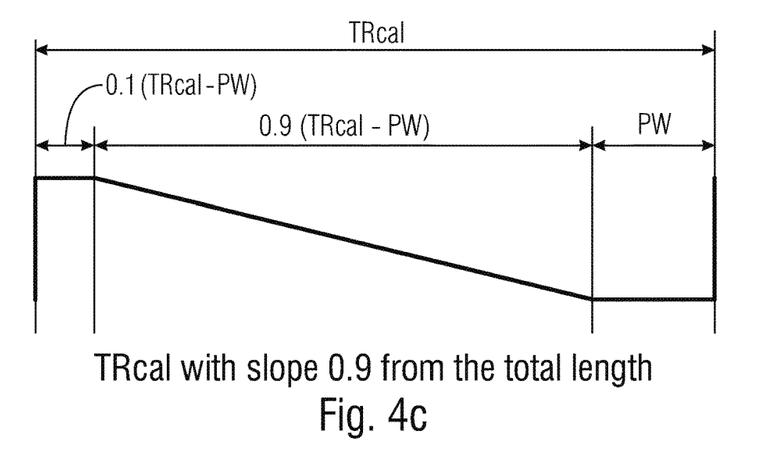

FIG. 4 shows examples for different shapes for the TRcal signal that make the RFID tag measurement process harder, resulting in increasing the rate tolerance. Each TRcal signal ends with a pulse of the given pulse width PW.

FIG. 4a shows a TRcal signal according to the state of art having a rectangular shape. This implies, that the part of the TRcal signal between the beginning of the TRcal signal and the beginning of the pulse has a constant value followed by a low pulse with width PW and with sharp and well defined edges.

This part of the TRcal signal is varied in FIGS. 4b and 4c. The shown parts have a slope ending at the beginning of the low pulse. The slopes cover 0,3 and 0,9, respectively, of the length of the part of the of TRcal ending at the pulse. The part of the TRcal signal to be shaped has a length of (TRcal−PW).

From measurements, the distribution of the rate tolerance due to measurement error follows normal distribution.

Figure 5:
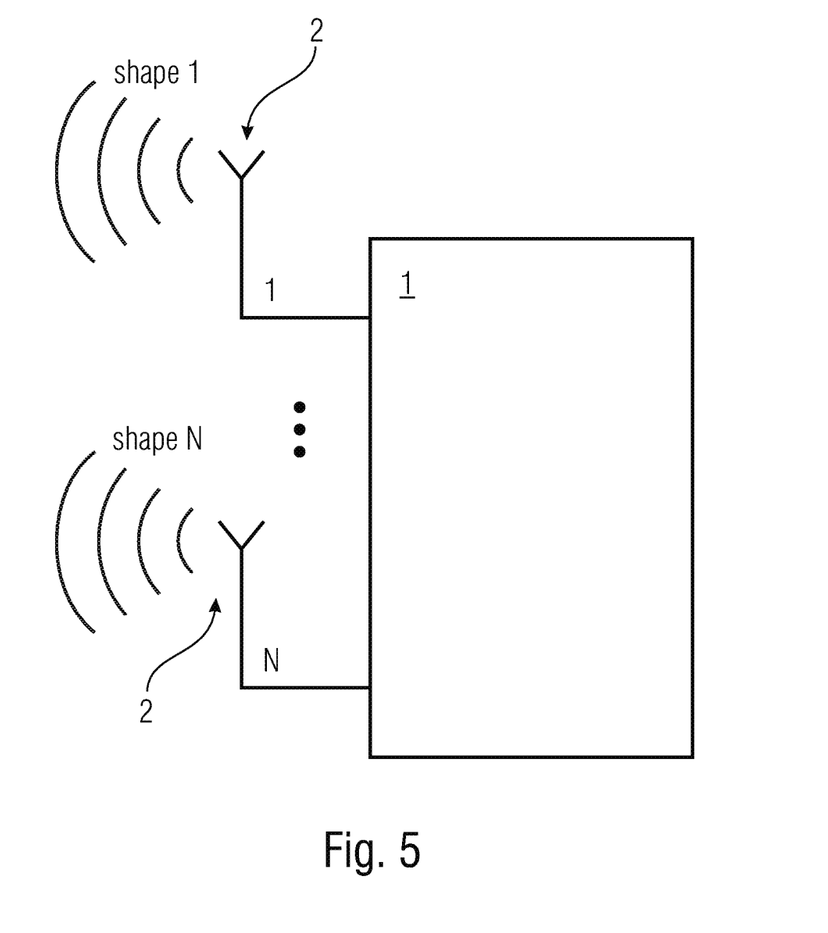
FIG. 5 shows schematically an embodiment of an RFID reader.

In an additional embodiment, the differently shaped TRcal signals of FIGS. 4b and 4c are transmitted from different antennas of a plurality of transmit antennas of an RFID reader shown in FIG. 5. Each shape is transmitted from a different transmit antenna to increase the probability of error of TRcal measurement by the RFID tags.

The RFID reader 1 shown in FIG. 5 has N antennas 2 which transmit query commands with differently shaped TRcal signals (Shape 1 to Shape N).

A different approach—which can be applied individually or combined with the foregoing—for obtaining individual Backscatter Link Frequencies rests on the working of the RFID tag.

Instead of measuring the TRcal only and to calculate the BLF directly from the measured value, the RFID tag measures the TRcal and calculates—based on its individual number, here RN16—the BLF.

Therefore, the BLF can be calculated as:

$$BLF = DR/TRcal * (1+\text{alpha}) \quad (2)$$

where alpha is a uniformly distributed number and is in one embodiment a function of the RN16 of the RFID tag.

The Probability Density Function (PDF) of alpha is in one embodiment:

$$PDF = \begin{cases} \dfrac{1}{b-\alpha} & \text{for } \alpha \in [a, b] \\ 0 & \text{Otherwise} \end{cases} \quad (3)$$

If both techniques are used, the total tolerance is a result of the measurement error of the TRcal signal and of the alpha factor.

So, a modification is needed to the RFID tag to calculate the BLF based on its individual number.

In addition or alternatively, a modification in the RFID reader is needed to transmit shaped TRcal signals to increase the tag BLF tolerance.

But with these changes the new RFID tag is not compatible with the standard. In other words, if the system has two types of RFID tags; conventional RFID tags (with normal BLF tolerance) and new RFID tags (change their calculation of BLF based on their individual numbers) and the RFID reader is the conventional one, the system will not work.

If the conventional reader uses the multiple correlators (Y. Liu, C. Huang, H. Min, G. Li, and Y. Han, Digital Correlation Demodulator Design for RFID Reader Receiver, IEEE Wireless Communications and Networking Conference WCNC 2007, pp. 1666-1670, 2007) based on the BLF tolerance in the standard, it will be lost when the tolerance violates the standard. Therefore, the modified RFID tag should recognize the type of reader.

If the reader is a modified one that can use frequency domain to estimate the rate (H. Salah, H. A. Ahmed, J. Robert, and A. Heuberger, FFT Based Rate Estimation for UHF RFID Systems, 2015 European Conference on Smart Objects, Systems and Technologies, pp. 1-5, 2015), the RFID tag can calculate its—individual—BLF based on its RN16 or its respective individual number as described in formula (2).

But if the RFID reader is a conventional one, the RFID tag will calculate the—common—BLF based on the TRcal measurement only.

To make the RFID tag recognize the RFID reader, the RFID reader sends in one embodiment a specific command—a switch signal—to the RFID tag to tell it about its type.

In one embodiment, the switch signal is a command with the number of bits: 16 and a description of: 1110001000000000.

From the discussion it is clear that the proposed inventive RFID tag and the proposed inventive RFID reader need modifications to stimulate the rate tolerance and utilize this stimulation and at the same time to be compatible with the UHF epcglobal class 1 gen 2 standard.

The modifications are explained in the following.

Modified RFID Tag:

The modified RFID tags have the same hardware as conventional UHF epcglobal class 1 gen 2 tags. They act exactly like the conventional RFID tags by default. However, they act differently when they receive a new command called switch signal from the new RFID reader. The new RFID tag generates its individual BLF based on formula (2), when it receives the switch signal from the RFID reader.

Modified RFID Reader:

The RFID reader has to be modified regarding its transmitter part to stimulate the tag rate tolerance and regarding its receiver part to utilize this stimulation.

Transmitter Part:

The modified RFID reader will send specially shaped TRcal signals to increase the BLF tolerance. These shaped signals can be transmitted either from single antenna or from multiple antennas. This modification will increase the probability to separate the collided RFID tags in the frequency domain as shown in FIG. 3.

In addition, the modified RFID reader will send a command or switch signal to all RFID tags in the interrogation area or in its vicinity.

The modified RFID tags only will understand this new command and calculate the BLF based on formula (2) instead of formula (1). The conventional RFID tags will consider the switch signal as an invalid command. The switch signal of the above mentioned embodiment is 16 bits from the future use part in epcglobal class 1 gen 2 standards table 6.18.

In one embodiment, the switch command is transmitted before the query command. In a different embodiment, the switch signal is a part of the query command.

Receiver Part:

The modified TRcal signals increase the BLF tolerance of the RFID tag replies independent whether the RFID tags are conventional or modified.

The modified RFID reader will apply in one embodiment the Fast Fourier Transformation (FFT) on the preamble pilot tone of the replies of the collided RFID tags for each antenna.

Afterwards, the Normalized Maximum Energy, NME, is calculated for each antenna based on:

$$NME = \frac{\text{Max. of energy for collided pilot tones}}{\sum \text{Energy in the expected band}} \quad (4)$$

Part of RFID Reader Detecting the RFID Tags (Detector):

The RFID tag that has the maximum energy is estimated in one embodiment by dividing the frequency domain of the collided pilot tones over the corresponding BLF to move from power spectrum to energy spectrum. Afterwards, the peak of the strongest signal can be measured, hence, the BLF of the RFID tag that has the strongest energy can be estimated.

The RFID reader can expect the band that RFID tags will reply on as it knows the maximum and the minimum of the BLF tolerance. Based on the above given formula (4), the RFID reader selects the antenna that has maximum NME. Then, the RFID reader estimates the rate of the strongest RFID tag (the tag that has maximum energy). This rate can be used to decode the strongest tag using correlator receiver as shown in FIG. 6.

Figure 6:
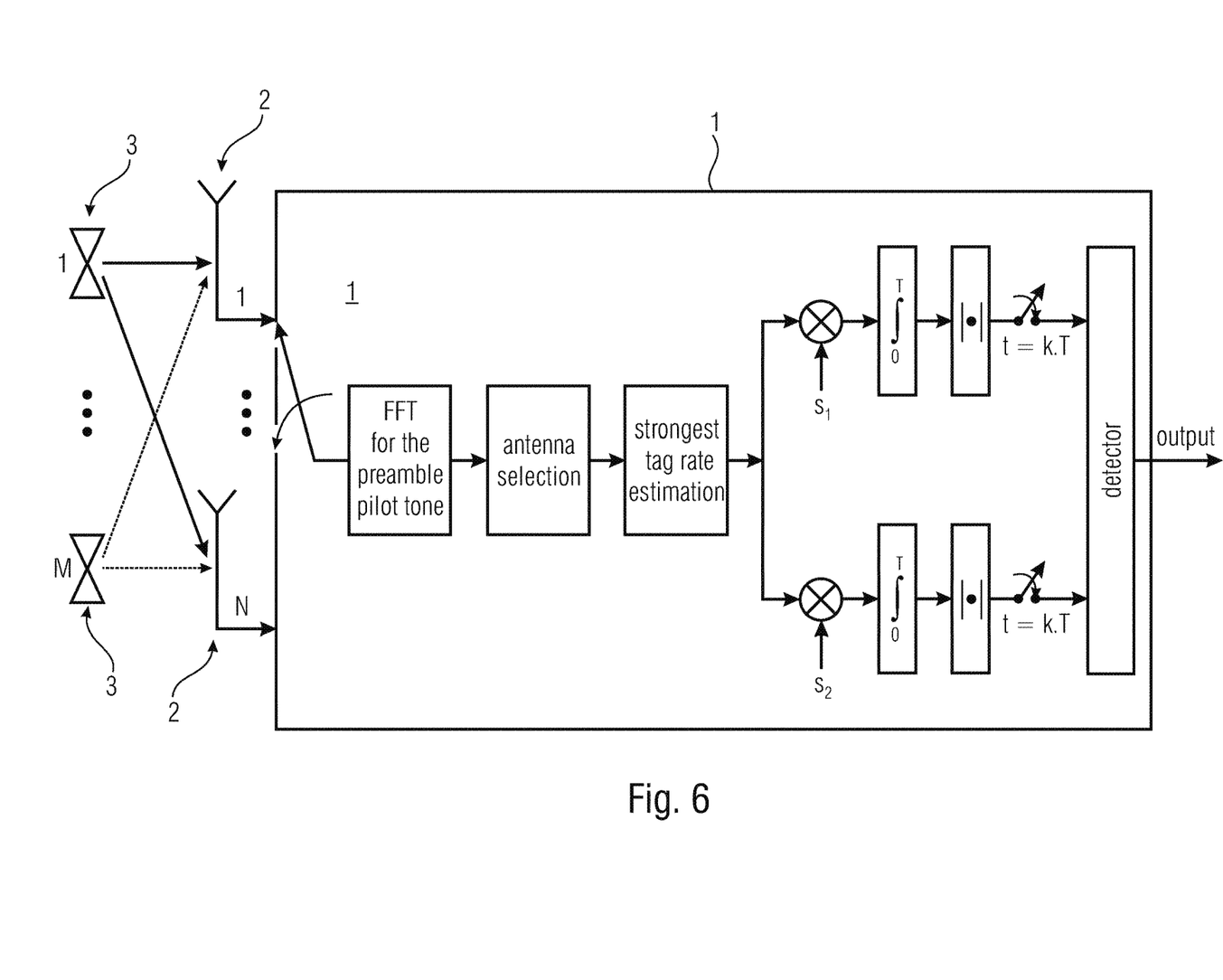
FIG. 6 shows schematically the interaction of an RFID reader with a plurality of RFID tags.

FIG. 6 shows one RFID reader 1 having N antennas 2 (1 to N) and M RFID tags 3 (1 to M) in its vicinity. The N antennas 2 transmit N query commands with differently shaped TRcal signals and receive the M replies from the M RFID tags 3. The RFID reader 1 is configured to switch between the different antennas 2.

Figure 7:
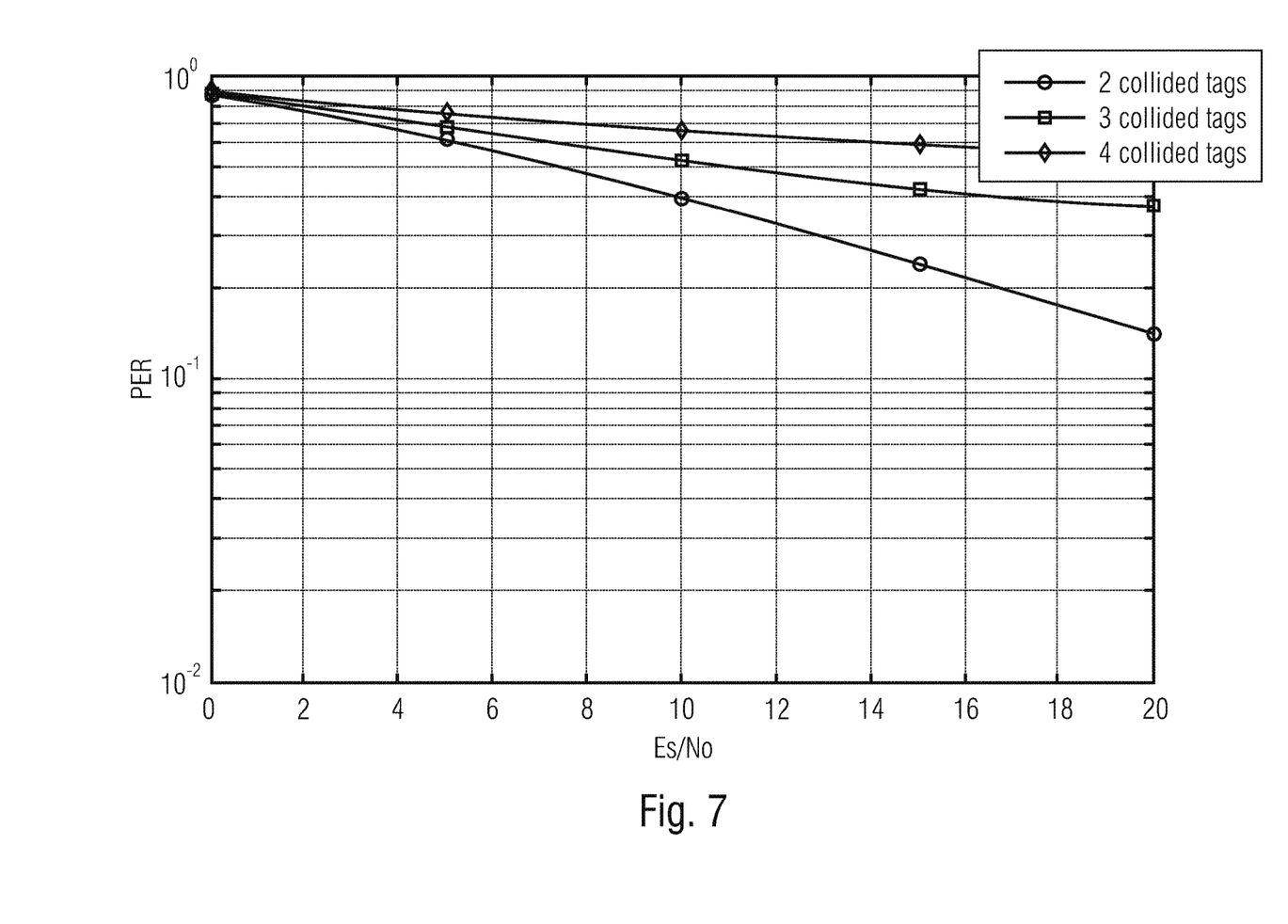
FIG. 7 shows the Packet Error Rate (PER) for synchronized collided tags over Rayleigh channel.

Performance Evaluation:

FIG. 7 shows the performance of the proposed receiver with synchronized collided RFID tags over double Rayleigh channel.

It shows that the number of antennas does not affect the performance at all, as the responses of the RFID tags are collided in time domain and also in frequency domain. However, the inventive RFID receiver recovers nearly 60%, 50%, and 35% of the slots that have two, three, and four collided RFID tags respectively at signal to noise ratio, SNR, equals 10 dB.

Figure 8:
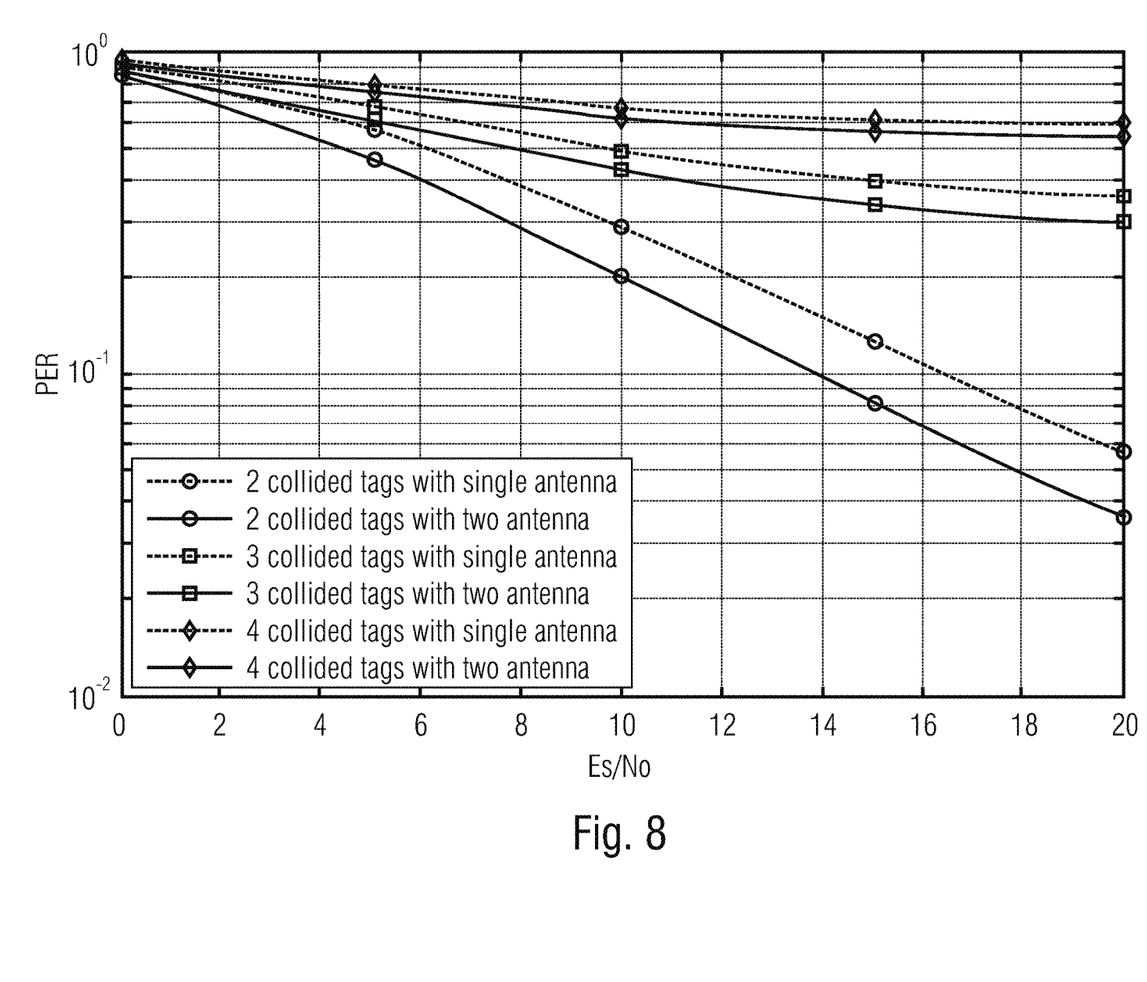
FIG. 8 shows the Packet Error Rate (PER) for non-synchronized collided RFID tags and BLF following formula (1) with maximum tolerance ±20%.

FIG. 8 shows the performance of the multiple antenna RFID reader shown in FIGS. 5 and 6 with collided non-synchronized RFID tags over Rayleigh channel. The performance is tested using RFID reader having one antenna and two antennas, respectively, and the BLF tolerance follows formula (1).

Figure 9:
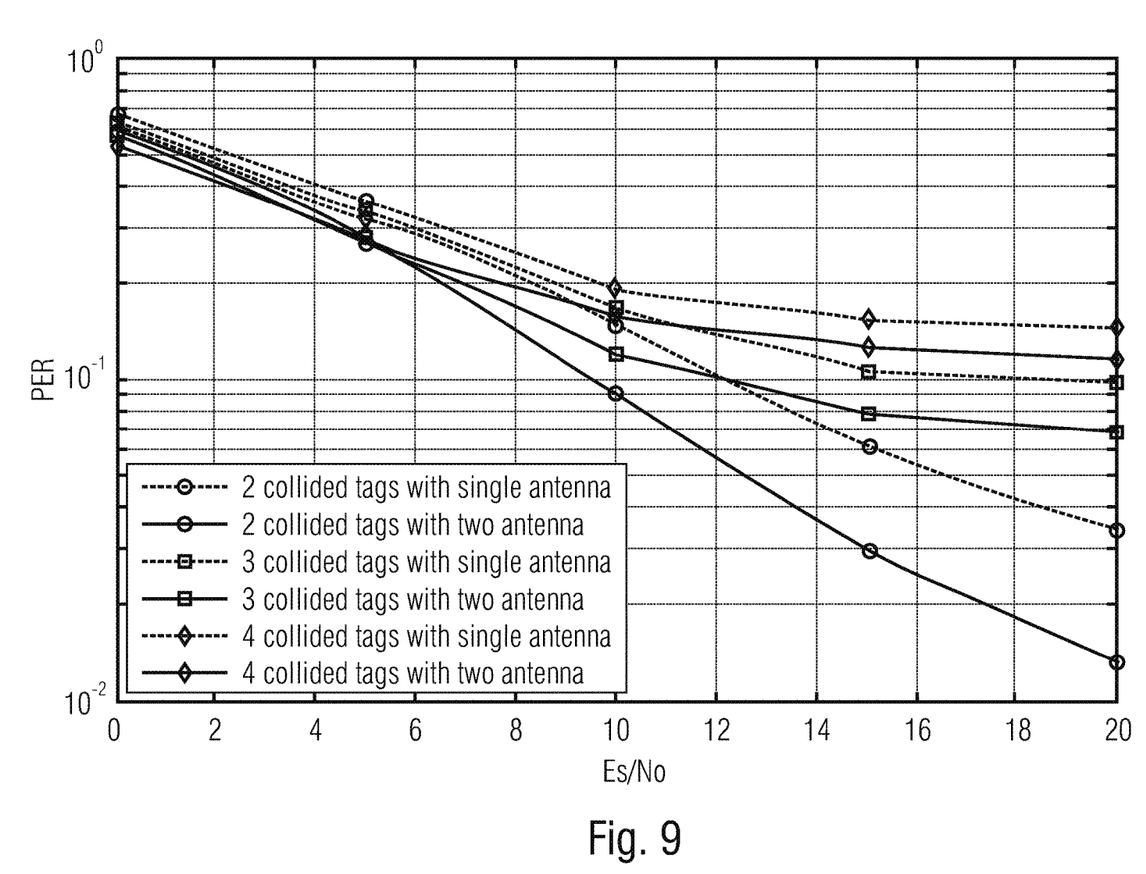
FIG. 9 shows the Packet Error Rate (PER) for non-synchronized collided RFID tags and BLF following formula (2)

The simulation shows that the gain of using single antenna receiver when two RFID tags collide is a round 2.5 dB over the synchronized ones. The gain reaches up to 4.5 dB, when two receive antennas are used. However, the performance is improved dramatically for two, three, and four collided RFID tags when the BLF tolerance follows formula (2) as shown in FIG. 9.

In this simulation, b=|a|=0.8 and the tolerance that comes from the TRcal signal shaping is assumed to have a maximum of +/−20%. The proposed system can recover 92%, 87%, and 83% of the slots that have two, three, and four collided RFID tags, respectively, at signal to noise ratio, SNR, equals 10 dB, when two receive antennas reader are used (the solid lines).

Figure 10:
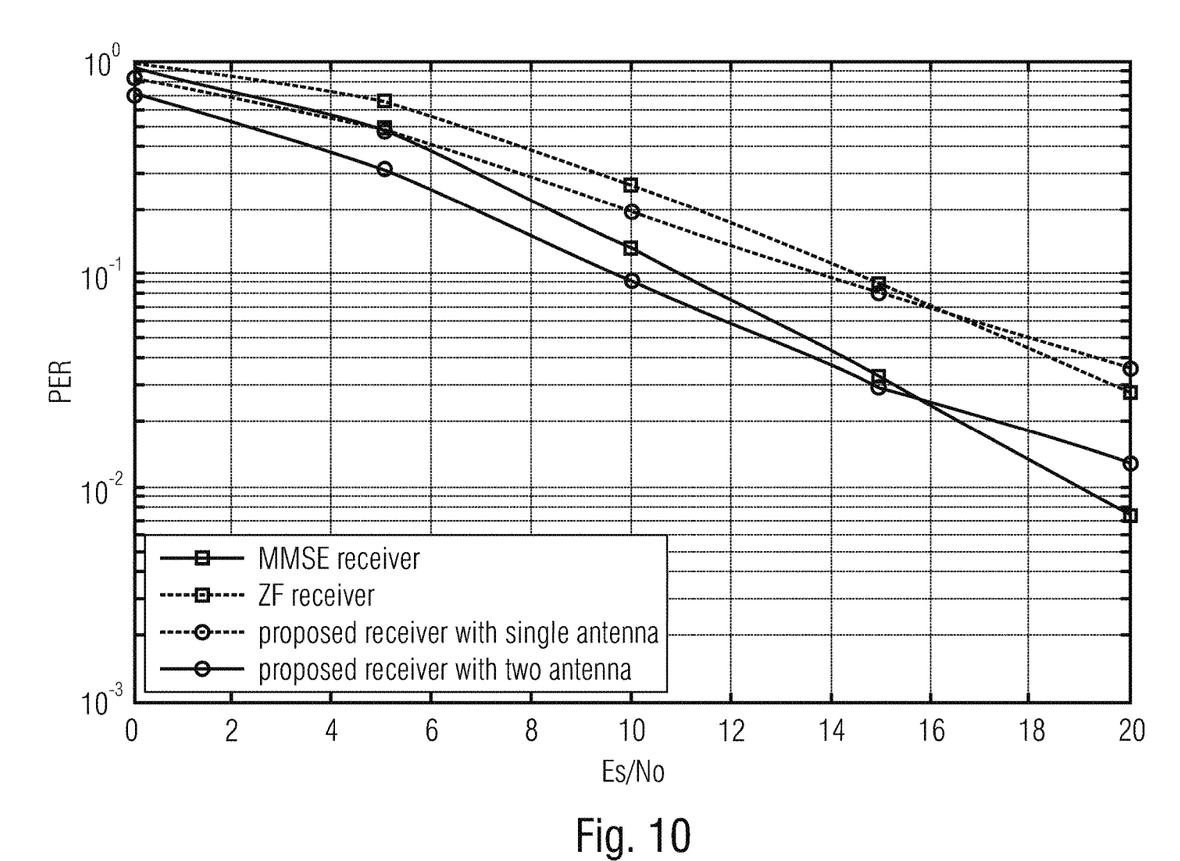
FIG. 10 shows the Packet Error Rate (PER) for the inventive RFID reader with two receive antennas and two collided RFID tags.

FIG. 10 shows a comparison between the Minimum Mean Square Error (MMSE), Zero Forcing (ZF), and the proposed receiver. The ZF and MMSE have two receive antennas but the proposed RFID reader is tested with single and two receive antennas. The Packet Error Rate (PER) is calculated for two collided RFID tags, however, the strongest RFID tag is selected for all of them.

The strongest RFID tag is selected for the MMSE and ZF receiver by selecting the ith RFID tag that has $\max\|H(:, i)\|$.

Compare C. Angerer, R. Langwieser, and M. Rupp, RFID Reader Receivers for Physical Layer Collision Recovery, IEEE Transactions on Communications, vol. 58, no. 12, pp. 3526-3537, 2010.

It can be seen that the inventive RFID reader gives better performance for low SNR (15 dB) because the ZF and MMSE have a noise enhancement and it affects the performance in the low SNR. However, the ZF and MMSE does not give any performance for three and four collided RFID tags as there is no channel estimation for them.

All previous simulations are done at sampling frequency fs=16 MHz, BLF=640 kHz, the RFID tag reply is encoded with FM0.

Figure 11:
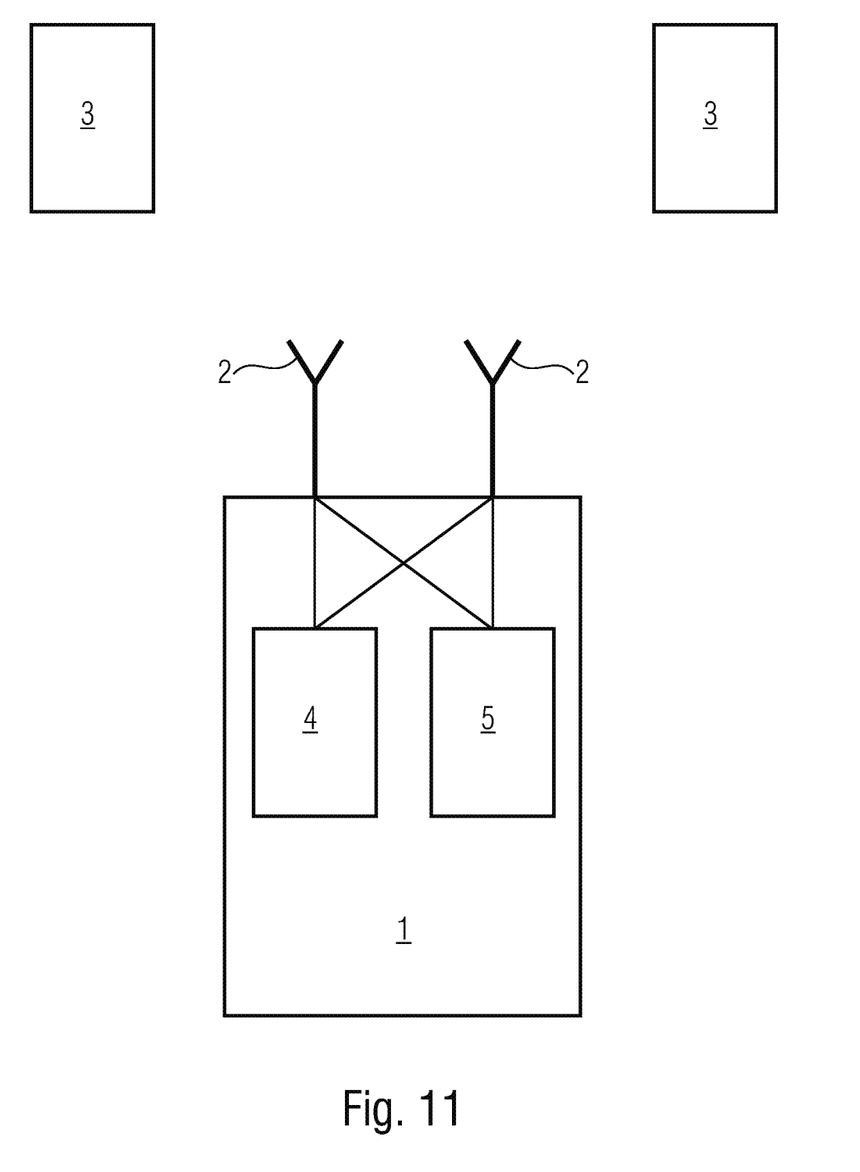
FIG. 11 shows schematically an interaction of an RFID reader with two RFID tags.

FIG. 11 shows a scenario in which an inventive RFID reader 1 communicates with two RFID tags 3 in its vicinity. Both RFID tags 3 have an individual BLF for their reply to a query command sent by the RFID reader 1. The different frequencies allows the RFID reader 1 to separate the responses of the RFID tags 3.

In the shown arrangement, the individual Backscatter Link Frequencies are the result of the increased measurement error for the measured duration of the TRcal signal. This is due to the shape of the TRcal signals within the query command.

The RFID reader 1 transmits via its two antennas 2 two differently shaped TRcal signals within the query command.

The individual BLF additionally results from its modified calculation using an individual number of the respective RFID tag 3.

The RFID reader 1 comprises in the shown embodiment a transmitter component 4 and a receiver component 5 which are both connected to the antennas 2. The transmitter component 4 adds the switch signal to the query command and is—in the shown embodiment—responsible for the shape of the TRcal signal comprised by the query command. The receiver component 5 allows to switch between the multiple antennas 2 and to identify within the received signals—being the replies from the RFID tags 3—the signals with the highest energy. With other words: the receiver component 5 differentiates between the replies of the different RFID tags based on their respective frequency.

In order to sum up, the invention refers to a new RFID system (RFID reader and RFID tag) and its components (RFID reader and RFID tag) compatible with UHF EPCglobal class 1 gen 2 standard including the following modifications which are at least partially present in the different embodiments either on both sides (RFID tag and RFID reader) or only on one side (either RFID reader or RFID tag):

RFID Tag Side:
1. Can work in one of two modes:
   a. The conventional mode (default) leading to a common BLF.
   b. The modified mode (switch to it based on switch signal or command) leading to an individual BLF.
2. Has the ability to generate an individual number being in one embodiment a random number based on its RN16 and this individual number will be passed to the oscillator to generate the BLF.

RFID Reader Side:
1. Is able to send a command to the RFID tags for switching between the calculations of the BLF.
2. Is able to shape the TRcal signal in order to increase the tags rate tolerance.
3. Has multiple transmit antennas for transmitting query commands or for transmitting the query commands with the shaped signals.
4. Is able to estimate the rate of the RFID tag that has the strongest energy.
5. Is able to switch between multiple antennas based on the NME of each antenna.

Advantages of Invention:
1. Using the proposed system, the reader can decode the strongest RFID tag blindly without any channel state information.
2. The proposed system can be used either with successful or collided slots without any performance loss.
3. The system can be used to recover the strongest RFID tag reply regardless of the number of collided RFID tags per slot. However the performance degrades, as the number of collided RFID tags increase.
4. The proposed system does not need any information about the number of collided RFID tags per slot.
5. The overall system is compatible with the EPCglobal class 1 gen 2 standard.
6. The new system can work with all type of RFID tag encoding schemes without any constrains.
7. The performance of the system can be increased by increasing the number of receive antennas of the RFID reader without any modification to the main algorithm.
8. The performance also can be increased by increasing the number of transmit antennas of the RFID reader, hence, increasing the number of TRcal shapes transmitted.

The invention is especially useful for all RFID applications which:
Follow EPCglobal class 1 gen 2 standards.
Have a dense number of RFID tags.
In which time is a very critical issue in the identification process.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A radio Frequency Identification (RFID) tag configured for communicating with an Radio Frequency Identification (RFID) reader,
   wherein said RFID tag is configured to receive a query command from said RFID reader,
   wherein said RFID tag is configured to measure a duration of a TRcal signal comprised by said query command, and
   wherein said RFID tag is configured to determine an individual Backscatter Link Frequency (BLF) for communicating with said RFID reader based on said measured duration of said TRcal signal and on an individual number,
   wherein said RFID tag is configured to determine said individual number by generating a random number.

2. The RFID tag of claim 1,
   wherein said RFID tag is configured to determine, depending on a switch signal from the RFID reader, either a common BLF for communicating with said RFID reader based on said measured duration of said TRcal signal or said individual BLF based on said measured duration of said TRcal signal and on said individual number.

3. A Radio Frequency Identification (RFID) reader configured for communicating with an Radio Frequency Identification (RFID) tag,
   wherein said RFID reader is configured to send a query command to said RFID tag, and
   wherein said query command enables said RFID tag to determine a Backscatter Link Frequency (BLF) for communicating with said RFID reader,
   wherein said RFID reader is configured to send said query command comprising a TRcal signal with a given duration within said query command,
   wherein said TRcal signal ends with a pulse with a given pulse width, and
   wherein a part of said TRcal signal between a beginning of said TRcal signal and a beginning of said pulse differs from a signal comprising a constant value by comprising a slope with a given value ending at said beginning of said pulse, thereby rendering harder the determination of the BLF by the RFID tag.

4. The RFID reader of claim 3,
   wherein said RFID reader is configured to send a switch signal, and
   wherein said switch signal determines whether said RFID tag determines either an individual BLF based on a measured duration of the TRcal signal or a common Backscatter frequency based on the measured duration of the TRcal signal.

5. The RFID reader of claim 3,
   wherein said RFID reader comprises a plurality of antennas.

6. The RFID reader of claim 5,
wherein said RFID reader is configured to send via said plurality of antennas query commands comprising differently shaped TRcal signals.

7. The RFID reader of claim 5,
wherein said RFID reader is configured to switch between antennas of said plurality of antennas.

8. The RFID reader of claim 7,
wherein said RFID reader is configured to switch to an antenna of said plurality of antennas based on a Normalized Maximum Energy of signals received by said plurality of antennas with $$NME = \frac{\text{Max. of energy for collided pilot tones}}{\sum \text{Energy in the expected band}}.$$

9. The RFID reader of claim 4,
wherein said RFID reader is configured to receive signals, and wherein said RFID reader is configured to identify within a received signal at least one RFID tag based on an energy of a reply of said RFID tag.

10. A method for recognizing at least one Radio Frequency Identification (RFID) tag by a Radio Frequency Identification (RFID) reader, comprising:
sending a query signal to said RFID tag,
determining by said RFID tag an Backscatter Link Frequency (BLF), and
communicating by said RFID tag using said BLF,
wherein:
said RFID tag determines as the BLF an individual Backscatter Link Frequency (BLF) for communicating with said RFID reader based on a measured duration of said TRcal signal and on an individual number, wherein said RFID tag determines said individual number by generating a random number, and/or
said RFID reader sends said query command comprising a TRcal signal with a given duration within said query command, wherein said TRcal signal ends with a pulse with a given pulse width, and wherein a part of said TRcal signal between a beginning of said TRcal signal and a beginning of said pulse differs from a signal comprising a constant value by comprising a slope with a given value ending at said beginning of said pulse, thereby rendering harder the determination of the Backscatter Link Frequency (BLF) by the RFID tag.

* * * * *